United States Patent [19]

Bogosian, Jr. et al.

[11] Patent Number: 4,838,791
[45] Date of Patent: Jun. 13, 1989

[54] MAGNETIC TRACKING AID FOR A HAND HELD SCANNER

[75] Inventors: Jasper Bogosian, Jr., Needham; Mayer Spivack, Chestnut Hill, both of Mass.

[73] Assignee: Xerox Corporation, Stamford, Conn.

[21] Appl. No.: 198,887

[22] Filed: May 26, 1988

[51] Int. Cl.⁴ .............................................. G09B 21/00
[52] U.S. Cl. .................................... 434/116; 235/472; 235/449
[58] Field of Search ................. 434/116; 235/449, 472

[56] References Cited

U.S. PATENT DOCUMENTS

| | | | |
|---|---|---|---|
| 3,676,938 | 7/1972 | Trehub | 434/116 |
| 3,700,809 | 10/1972 | Nadon | 178/87 |
| 3,874,097 | 4/1975 | Mauch et al. | 434/116 |
| 3,918,179 | 11/1975 | Mauch et al. | 35/35 A |
| 4,518,919 | 5/1985 | Ishida | 324/228 |

FOREIGN PATENT DOCUMENTS 2542483  9/1984  France ................................ 434/116

Primary Examiner—Leo P. Picard
Attorney, Agent, or Firm—Robert A. Chittum

[57] ABSTRACT

A magnetic tracking aid for use with a hand held optical scanner is disclosed. It consists of a magnetic flat substrate having a hinged magnetic flap at its top edge to form a clip board configuration. An individual sheet or page of a bound volume is aligned with the top edge of flat substrate, and a magnetic strip, hinged to the top edge, is rotated onto the page to lock it into the aligned position. A second magnetic strip is used to keep the aligned page locked into position when the first strip is raised to enable scanning of the top portion of the page. Alternate rows of north and south pole lines are formed on the flat substrate. A small sheet magnet is adhered to the bottom of the scanner which has identical rows of north and south pole lines so that the opposite poles are attracted to those on the flat substrate to assist in maintaining the orientation of the scanner while it is being moved by a blind user to scan a swath of printed text. The magnetic force fields between rows of opposite polarity poles enable the provision of audible and tactile feedback to the user when adjusting the scanner for subsequent scans.

7 Claims, 3 Drawing Sheets

MAGNETIC TRACKING AID FOR A HAND HELD SCANNER

BACKGROUND OF THE INVENTION

1. Field of the Invention

This invention relates to a tracking aid for hand held optical scanners, and more particularly to a tracking aid for hand held optical scanners used for input to a character recognizing and voice synthesizing reading machine to enable manual scanning by the blind or by the print handicapped for the purpose of converting substantially any printed text into synthesized human voice.

2. Description of the Prior Art

An existing reading machine for the blind requires that the visually impaired person take the printed material, such as a book, to a reading machine and place it opened face down on a fixed platen, one page at a time, so that the printed text thereon may be scanned, converted into video or digitized data, converted to ascii representation, and then converted to sound by a voice synthesizing system. The user must lift a bound volume or printed material after each page has been scanned, the page must be turned, and the next page in the bound volume realigned on the platen. Such manipulation of bound volumes of printed material is cumbersome for a visually impaired person, and the task of scanning the pages would be simpler if the bound volume could remain stationary and only the pages turned after they were scanned by a small, compact hand held scanner.

Copending U.S. application Ser. No. 104,741, filed Oct. 5, 1987, to Sussman et al., entitled "Hand Held Optical Scanner for Omni-Font Character Recognition" discloses a small hand held scanner connected by a flexible cable to a portable character recognizer and voice synthesizer. This scanner contains components for scanning swaths of printed text from single sheets or bound pages of bound volumes. The components are housed in an elongated dust-tight carriage. A broad roller is rotatably mounted on one edge of the carrier and a split roller is rotatably mounted on the opposite edge. The roller axes are coplanar and parallel with each other, so that when the carriage is manually moved across the page to be scanned, a window in the carriage floor is maintained a predetermined distance therefrom and the rollers guide the carriage in a substantially straight line without need of guide rails. A strobed LED array provides the illumination for a 423 element per inch CCD array via a Selfoc ® lens. A rotary encoder is belt coupled to the split roller to provide speed and scanning direction signals. Circuitry is provided for processing the CCD array output signals in accordance with the rotary encoder signals.

U.S. Pat. No. 3,918,179 to Mauch et al. discloses an apparatus for teaching the blind to scan a single document of printed matter placed on a flat surface of a transparent substrate. The printed matter is scanned with a manually moved optical probe by using a structure capable of releasably holding the upper edge of the document on the releasably held substrate while a manually applied tracking aid relesably holds another portion of the document. The tracking aid is manually adjusted after each line of printed matter is scanned. The next and succeeding lines of printed matter to be scanned requires that the tracking aid be manually repositioned.

U.S. Pat. No. 3,700,809 to Nadon discloses a tubular hand positionable cursor for taking position signals from a flat grid. The cursor includes a coil in a cylindrical recess adjacent one end thereof. Energization of the coil produces a field or flux so that inductive coupling eliminates the need for physical contact between the cursor and the grid. The cursor end containing the coil is configured so that the effects of changes in orientation of the cursor parallel to the plane of the grid are eliminated and the effects of orientation changes normal to the plane of the grid are minimized.

U.S. Pat. No. 4,518,919 to Ishida discloses a detecting device for detecting a magnetic strip embedded in a sheet, such as, for example, a currency note. The detecting device comprise a magnet and magnetic resistance element located within the magnetic field generated by the magnet. When the magnetic strip in the note passes through the magnetic field generated by the magnet, the change in field is detected by circuitry. This circuitry detects the change in resistance of the magnetic resistance element. By sensing the change in resistance of the resistance element and comparing it with a predetermined value, the existence or non-existence of the magnetic strip can be determined.

Most of the prior art hand held optical scanners for use by the blind or print handicapped provided mechanical guides for the optical scanner. Those without any tracking assistance encountered a skewing motion that impeded the conversion of printed information to ascii code for all but the most experienced user.

SUMMARY OF THE INVENTION

It is an object of this invention to provide a blind or print handicapped person with a tracking aid to be used in conjunction with a hand held optical scanner.

It is another object of this invention to provide a tracking aid which assists a blind or print handicapped person in knowing where the page to be scanned is relative to the hand held scanner, while preventing page motion and insuring that the scanner motion is perpendicular to the printed text on the page.

It is still another object of this invention to provide a tracking aid which maintains the page to be scanned within the required flatness to accommodate the hand held optical scanners depth of field.

It is yet another object of this invention to provide a tracking aid which in combination with the hand held optical scanner enables audible and tactile feedback to the blind or print handicapped user.

In the present invention, a magnetic tracking aid for use with a hand held optical scanner which converts printed text into video signals that are converted by an associated reading machine for the blind to synthesized human voice is disclosed. The magnetic tracking aid consists of two elements. One, a magnetically charged flat substrate having a hinged magnetic flap at the upper edge thereof to form a "clip board" configuration, and second, a small sheet magnet attached to the confronting underside of the hand held scanner. The flat substrate is magnetized so that alternate north and south pole lines are perpendicular to one side and parallel to the upper edge with the magnetic flap. Tracking motion is controlled as the hand held scanner is moved across the flat substrate of the clip board configured assembly in a direction parallel with the north and south pole lines thereof. The sheet magnet of the hand held scanner has poles which align with the poles of opposite polarity on the tracking aid flat sheet. The resultant magnetic force inhibits the user from moving off line as the hand held scanner is manually traversed across the page of printed text sandwiched between the flat substrate and the scanner's sheet magnet. Since the pole line spacing is fixed, the hand held scanner can also be indexed down a known distance. Audible sounds or clicks for the user to hear is generated as the hand held optical scanner is moved down the tracking aid in preparation for the next traversal across the page. The user will also feel the hand held optical scanner "hop" as like poles repel and unlike poles attract. The flat substrate of the tracking aid is placed behind each page of printed text and the upper flap rotated down on top of the page to lock the page to the flat substrate in clip board fashion. An optional separate magnetic strip with the alternate north and south pole lines can be used to lock the lower portion of the page of printed text in place. The flat substrate of the clip board configuration is larger than the pages to be scanned to prevent the hand held scanner from being moved totally off the page that is being scanned. The tracking aid prevents skewing of the hand held scanner during the manual traversal thereof to scan each swath of printed text. It is also stiff enough to maintain the required page flatness and to maintain the correct depth of field for the hand held scanner.

The foregoing features and other objects will become apparent from a reading of the following specification in connection with the drawings, wherein like parts have the same index numerals.

DESCRIPTION OF THE PREFERRED EMBODIMENT

Figure 1:
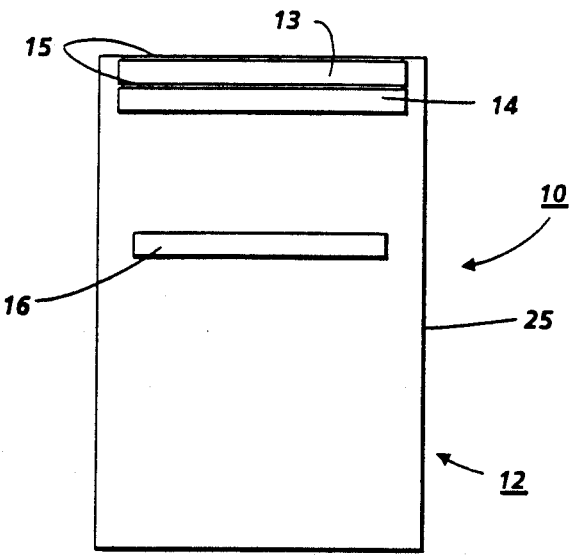
FIG. 1 is a schematic plan view of the magnetic tracking aid of the present invention.
Figure 2:
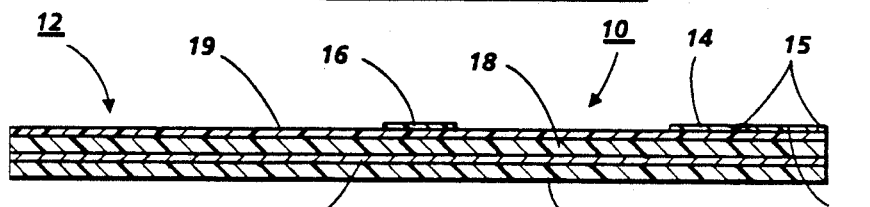
FIG. 2 is a schematic side view of the magnetic tracking aid of FIG. 1.

The magnetic tracking aid assembly 10, shown in FIGS. 1 and 2, utilizes the basic magnetic principle that unlike poles attract and like poles repel. The magnetic tracking aid assembly has a relatively flat plate 12 comprising several layers, described below. This flat plate 12 has a magnetized layer 18 having alternate north and south pole lines 31, 32 that are pendicular to the edge 25, normally placed adjacent the binding of bound volumes such as books and the like, discussed later with respect to FIGS. 6 and 7. A similar but smaller sheet of magnetizable material 34 (FIG. 10) having alternate north and south pole lines is adhered to the bottom of a hand held optical scanner of the type disclosed in the above-mentioned copending application to Sussman et al. The manual scanning motion of the hand held optical scanner is controlled as it is moved across the flat plate 12 by the magnetic fields generated between the rows of magnetic poles of the magnetic tracking aid and the confronting rows of magnetic poles of the sheet magnets 34. The magnetic poles of the sheet magnet 34, which is attached to the bottom of the hand held scanner 11, are aligned with the opposite poles of the tracking aid 10. The resultant magnetic force inhibits the user from moving the scanner out of the desired scanning path.

Figure 8:
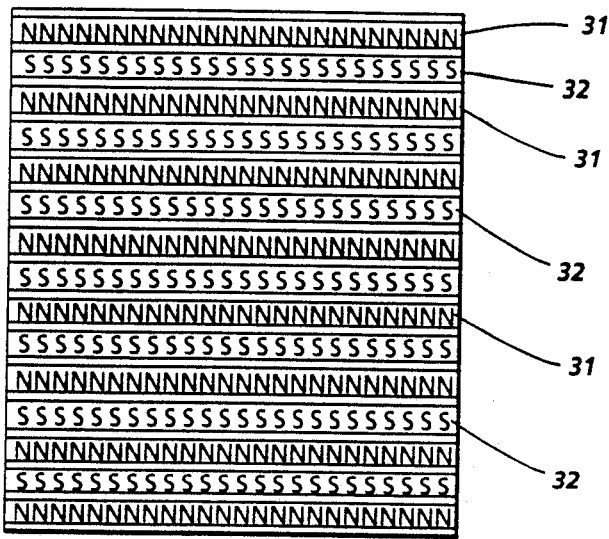
FIG. 8 is a schematic representation of the magnetic pole orientation of the lines of magnetization on the tracking aid.
Figure 9:
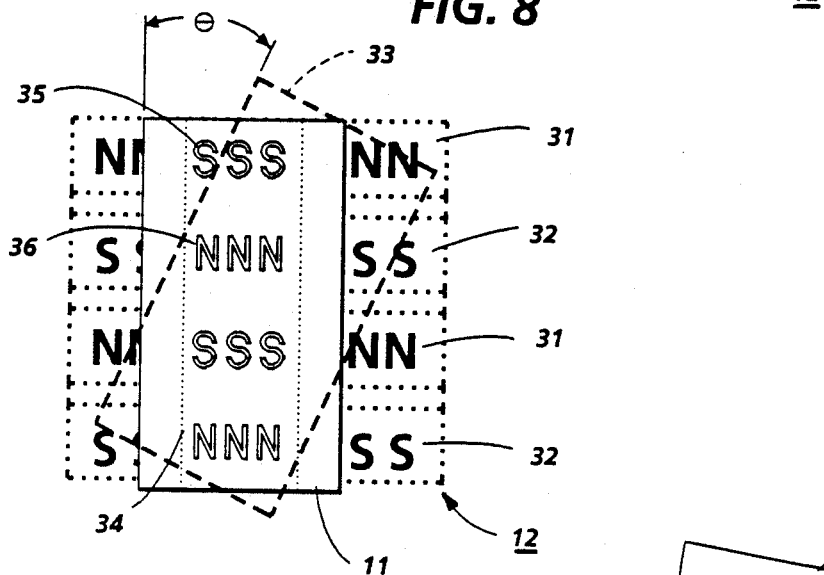
FIG. 9 is a schematic representation of the magnetic pole alignment of the magnetic tracking aid and the scanner magnet.

FIG. 8 shows a schematic representation of the lines of alternating magnetic poles 31, 32, and FIG. 9 schematically shows the hand held optical scanner 11 on the magnetic tracking aid 12, with the sheet magnet 34 thereof shown in dashed line. The alternating lines of opposite magnetic poles of the scanner's sheet magnet 34 are attracted to the poles of opposite polarity on the magnetic tracking aid. The attraction of unlike poles between the sheet magnet 34 on the hand held scanner and the magnetic poles on the magnetic tracking aid prevent the hand held scanner from being skewed beyond an acceptable limit as it is moved parallel with the rows of magnetic pole lines. This skew is represented by the position of the hand held scanner shown in dashed line 33 and rotated from the normal perpendicular orientation of the hand held scanner relative to the lines of magnetic poles by the angle $\theta$.

A skew angle $\theta$ of up to 5 degrees has been found to be acceptable. Since the pole line spacing is fixed at 18 poles per inch, the hand held optical scanner can be indexed perpendicular to the lines of magnetic poles by a known distance. Audible sounds or 'clicks' are generated as an aid to the user when the hand held scanner is moved after one scanning traversal across a page of printed text to the location for the next scanning traversal. In addition, the user will also feel the hand held scanner 'hop' as it indexes from one line of magnetic poles on the magnetic tracking aid to another. This is caused by the like poles repelling and the unlike poles attracting.

Referring to FIGS. 1 and 2, the magnetic tracking aid 10 comprises a large flat laminated substrate 12. Elongated magnetic strips 13 and 14 are hinged together by hinge 15a along their adjacent longer edges, with the magnetic strip 13 hinged by hinge 15b to the upper edge 39 of the flat substrate 12 to form a clip board-like configuration. A third, non-attached, elongated magnetic strip 16 is optionally used to hold a page in place. This magnetic strip 16 is manually placed on the page to be scanned, with the elongated direction of this strip being generally parallel to strips 13 and 14. As will be better understood later, the planar dimensions of the large magnetic substrate 12 are such that they are always larger than the sheet or page containing the printed text to be scanned.

In the preferred embodiment, the flat substrate assembly 12 is rectangular and may be either 9.5 inches wide by 12 inches high for large individual sheets or large book pages, or 7.5 inches wide by 10.5 inches high for regular book size pages. The magnetic strips 13 and 14 are attached to the upper shorter edge 39 of the flat substrate assembly by hinge 15b, with each magnetic strip being about three-quarters of an inch shorter than the width of the flat substrate assembly and centered at the top thereof. The optional strip 16 is approximately 4 inches by 0.75 inches. As better seen in FIG. 2, the flat substrate assembly comprises a layer 18 of flexible permanent magnetic material about 33 mils thick. In the preferred embodiment this material comprises barium ferrite crystals oriented in a polymer binder and is constructed such that they have 18 poles per inch. However, other applications may require different pole spacing. The flexible permanent magnet material has an energy product of $1.4 \times 10^6$ Gauss-Oersted. A thin protective layer of around 5 mils thick of any film forming material, such as, for example, polyurethane, is placed over the surface of the magnetic material layer 18 to prevent abrasion by the scanner and the sheets or pages of printed text. Optionally, a 2.5 mil steel backing layer 20 may be provided to increase the magnetic fields, thus, the 'reach out' capabilities of the magnetic tracking aid is increased by about 30 percent. In other words, the steel backing layer enables the magnetic force fields to better traverse an air gap. Note that applications with fewer poles per inch may not require the steel backing layer 20, because the fewer the poles, the better the reach out of the magnetic fields. The flexible permanent magnet material comprising barium ferrite crystals oriented in a polymer binder is commercially available and may be purchased from the 3M Company under the tradename of Plastiform Brand #B1046 having a metal back or #B1044 having a non-metal back. A 25 mils thick, semi-rigid layer of polycarbonate, such as, for example, Lexan®, is attached to the bottom of the magnetic material layer 18 or the optional steel layer 20 to add enough rigidity to the flat substrate, so that it will remain relatively flat in order to maintain the proper depth of focus of the scanner and yet permit some slight bending which prevents inadvertant tearing out of bound pages. As disclosed in the above-mentioned copending application to Sussman et al., the hand held optical scanner is approximately 2.5 inches long by 1.2 inches wide by 1.4 inches high and has a field of view of one inch. A five-eighths inch square magnetic strip is adhered to the bottom of the hand held scanner. The magnetic strip 34 has the same number of poles per inch as the magnetic layer 18 of the tracking aid 12, and aids in maintaining the orientation of the hand held scanner during its manual traversal of a swath of printed text by allowing it to skew only up to five degrees before it jumps a track or line of poles. For the same reason as mentioned above, the scanner magnetic strip 34 may also have a steel layer about 2.5 mils thick. This maximum skew or angle $\theta$ as seen in FIG. 9, is acceptable for scanning printed text by the hand held scanner.

Figure 3:
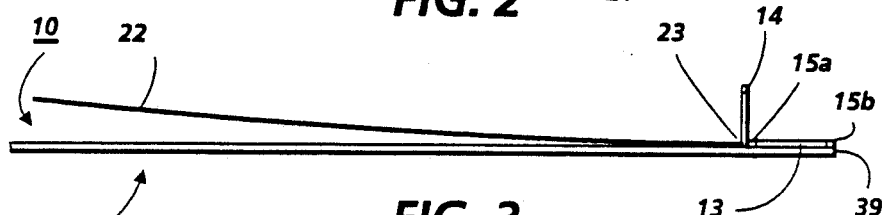
FIG. 3 is a schematic side view of the magnetic tracking aid showing partial installation of a page of printed text to be scanned.
Figure 4:
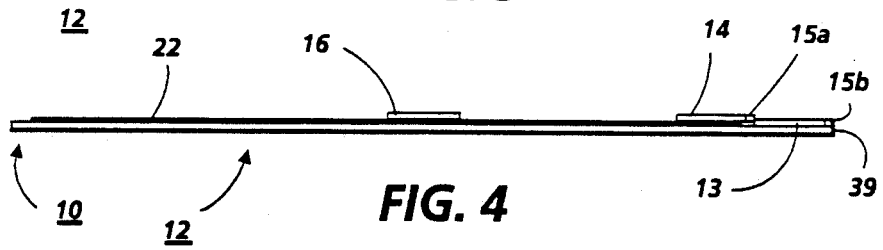
FIG. 4 is a schematic side view of the magnetic tracking aid showing a fully installed page of printed text.
Figure 5:
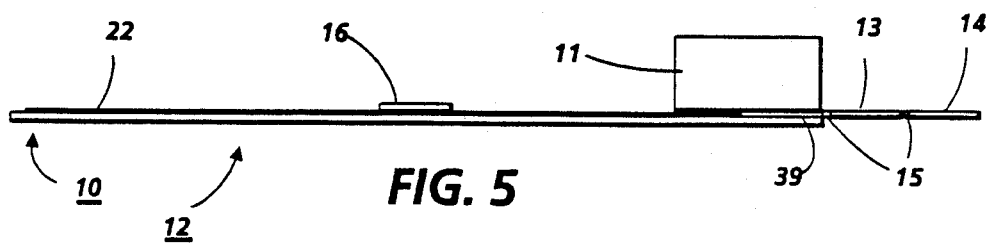
FIG. 5 is a schematic side view of the magnetic tracking aid similar to FIG. 4 but showing the hand held scanner positioned to scan the top of the page.
Figure 6:
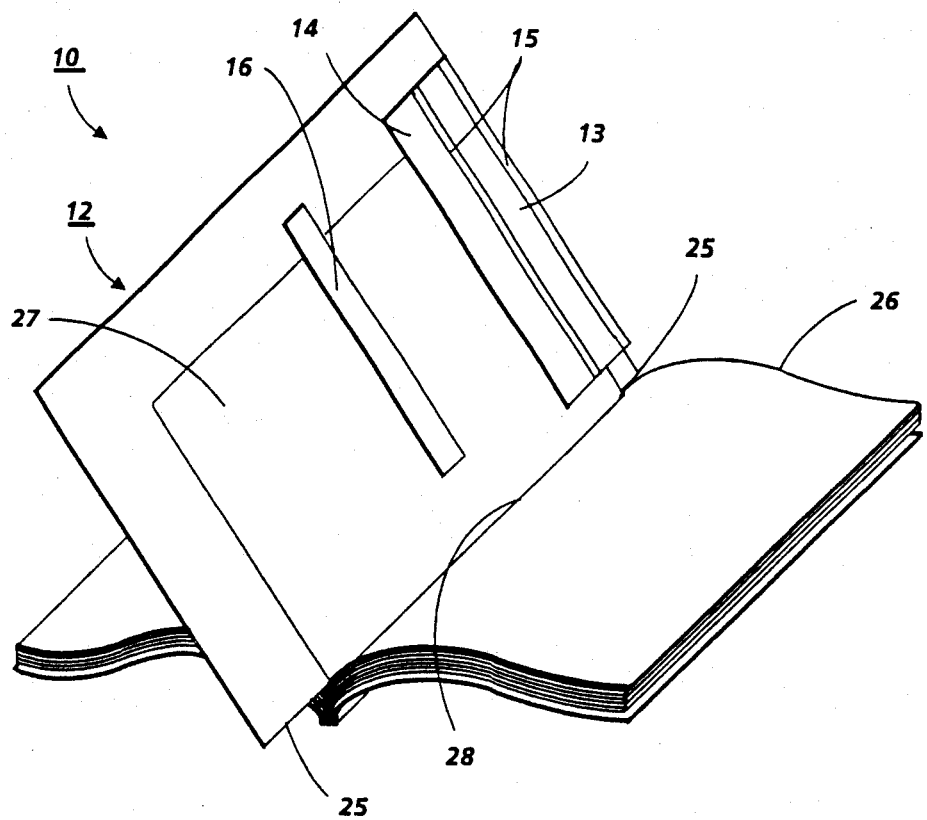
FIG. 6 is a schematic, isometric view of the magnetic tracking aid installed on one page of a bound volume.
Figure 7:
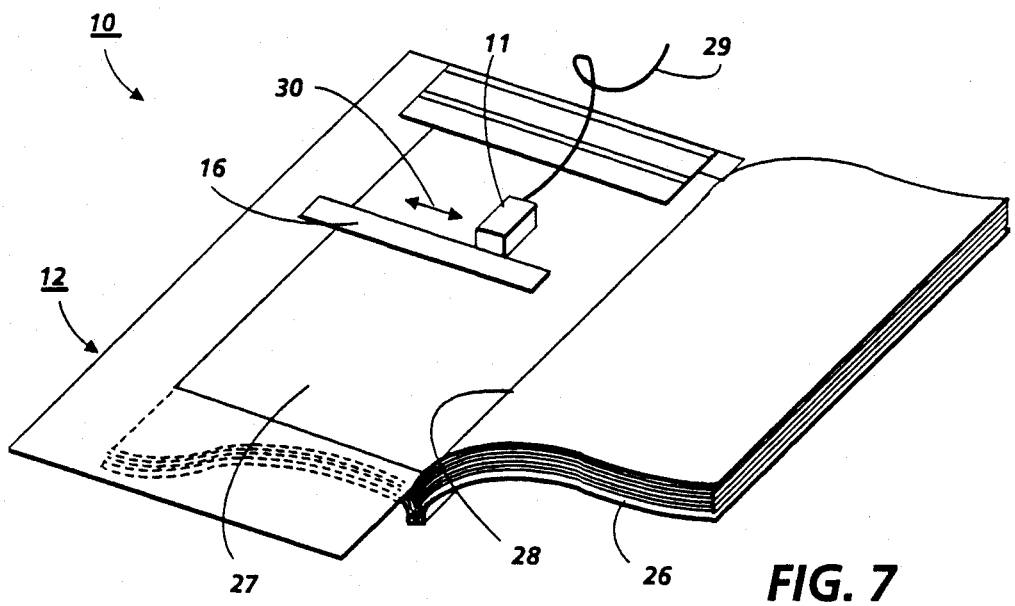
FIG. 7 is a schematic, isometric view similar to that shown in FIG. 6, but the page to be scanned is oriented for scanning by the hand held optical scanner.
Figure 10:
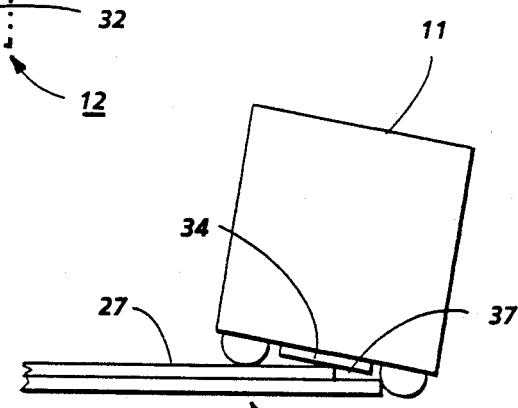
FIG. 10 is a schematic representation of the hand held optical scanner magnetically stopped by the tracking aid to prevent separation of the scanner from the page being scanned in case of an overrun by the user.

FIGS. 3-6 depict the installation of an individual sheet or page of a book to be scanned on the magnetic tracking aid. In FIG. 3, strip 14 is rotated about hinge 15a and is raised to a perpendicular position relative to the flat substrate assembly. After the strip 14 has been raised, edge 23 of strip 13 is used to align the paper or a top edge of a page in a bound volume. Magnetic strip 14 is rotated flat against the paper or page 22 to lock it in place in a clip board manner. The page 22 is then smoothed against the flat substrate assembly and the optional magnetic strip 16 is positioned against the sheet 22 to lock it into place. In FIG. 5, the clip board strips 13, 14 are both rotated about the hinge 15b to enable the hand held scanner to be placed there to scan the top of the page or sheet 22, while strip 16 helps maintain the sheet being scanned into a locked position. Referring to FIG. 6, the magnetic tracking aid is shown installed on the page 27 of bound volume 26 with edge 25 resting against the binding 28. Once the magnetic strips 13, 14 and 16 are locked into position, the page 27 to be scanned is rotated to the horizontal position, as shown in FIG. 7, and the hand held scanner 11 is placed thereon for scanning backward and forward in a direction indicated by arrows 30. The weight of the magnetic tracking aid prevents the page from turning or flipping and, because the flat substrate assembly is somewhat flexible, it allows a slight page curvature to prevent stress on the page being scanned which would tend to tear it out of the bound volume. Because the magnetic strips 13 and 14 are hinged, they may be rotated out of the way when that portion of the page is to be scanned. Note that at least one of the strips 14 or 16 is always locked in place during the scanning period. The relatively large substrate assembly 12 is designed to be larger than the page of printed text to be scanned so that the scanner is brought to a halt as it leaves the edge of the page 27 as shown in FIG. 10. The spacing between the magnetic strip 34 attached to the hand held scanner and the flat substrate assembly 12 is decreased causing stronger attraction between the two. This stops the scanner and prevents the user from losing the location of the scanner relative to the page. The normal air gap between the magentic strip 34 attached to the bottom of the hand held optical scanner and the magnetic tracking aid is approximately 26.5 mils, assuming the intermediate page or print text is 4.5 mils thick.

Studies have indicated that the user's initial attempts to scan a page of printed text encounter several problems. A blind user has trouble knowing where the page is relative the the hand held scanner. The user searches or gropes for the page edge when first setting the hand held scanner thereon. This situation causes speed variation and premature stopping before the whole line is scanned. During the manual movement of the hand held scanner, the blind user has extreme diffulty in preventing a skewed traversal. This problem is further complicated when the user has to devise a method to increment down a page for the subsequent scans. Page or paper motion relative to the scanner is difficult to control and should be prevented. This situation is more pronounced when the user increments down before making a new scan across the page. The paper movement generally causes the user to lose his place. The blind user also has difficulty insuring that the hand held scanner is perpendicular to the printed text. The problem is even more pronounced at the page edge opposite the bound volume binding. Unfortunately, the hand held scanner requires a minimum flatness because of the depth of field of the scanner. The minimum radius of the surface of a page to meet this depth of field requirement is about a five inch radius. Generally, bound volumes have at least portions of the pages curved about a radius of 1.5 inches. And finally, the blind user has difficulty in preventing inadvertent page flipping while trying to scan a page of printed text.

All of the above problems have beenresolved by the magnetic tracking aid. This magnetic tracking aid is designed so that it can also be used for large or small books and for individual sheets or pages of a bound volume. In operation, two magnetic strips or flaps 13, 14 are used to hold the individual sheets 22 or page 27 of printed text. The top magnetic strip edge 23 of strip 13 is used to align the paper to the magnetic tracking aid by rotating strip 14 about hinge 15a. The blind user merely lifts up the top magnetic strip 14 to position a page to be scanned. They then position this page to be scanned on the flat plate assembly 12 and against the magnetic strip edge 23 of strip 13. Once aligned, magnetic strip 14 and optional strip 16 are lowered onto the paper, whereat the magnetic strips will lock into place. To scan the top line of the page, the top magnetic strips 13 and 14 are raised and rotated about hinge 15b to the position shown in FIG. 5. The hand held scanner is then placed on the page aligned to the top left corner of the flat substrate assembly. The user insures proper hand held scanner alignment by twisting the camera until the maximum magnetic attraction is felt. When a single sheet or the left hand side of a bound volume is being scanned (see FIG. 7), the user guides the hand held scanner from the left to the right or vice versa until either a mechanical stop occurs, as shown in FIG. 10, or until the scanner contacts the binding 28 of a bound volume. The mechanical stop is caused by the decrease in the gap between sheet magnet 34 on the scanner and the magnetic surface 18 of the magnetic tracking aid 12 which results in an increase in the magnetic attracting force. The user then slides the hand held camera vertically down a predetermined number of audible sounds or clicks, while also noting the predetermined number of pulses or hops encountered by the hand held scanner before the next scan. This process continues until the whole page is scanned. Note the magnetic strips are alternately disengaged to allow non-interference with the scanning. The relatively large flat substrate assembly can be used for large books, magazines, or stapled sheets, while a smaller version may be used for normal size books and paperbacks.

As mentioned above with respect to FIGS. 6 and 7, the magnetic strips lock the page of the bound volume in place. Alignment is insured by abutting the tracking aid edge 25 against the binding 28. The magnetic tracking aid is semi-rigid which guarantees a near flat surface. However, the magnetic tracking aid must have a minimal flexibility to prevent pages from being torn from tightly bound books. Since the page is now virtually a flat sheet, scanning is done per the individual flat sheet method discussed above. The user will find it necessary only to lightly urge the hand held optical scanner in a direction parallel with the magnetic pole line and lines of print, the magnetic field pattern will limit skew to within five degrees. When indexing the hand held scanner downward or upward to another line of printed text on the page, the hand held scanner will be felt and heard as it moves across the lines of magnetic poles to a new crisply aligned position at the next line to be read.

Thus, the hand held optical scanner skew during the manual traversal across a page will always be held to less than 5 degrees. The minimum radius of the page of reading material will be maintained at about 5 inches to maintain the depth of field, and the hand held scanner will be stopped when it reaches the end of a page. The indexing of the hand held scanner up or down for the next line of information to be scanned is readily identified by audible and tactile feedback to the user.

Although the foregoing illustrates the preferred embodiment of the present invention, other variations are possible. All such variations that would be obvious to one skilled in the art are intended to be included within the scope of this invention as claimed by the following claims.

We claim:

1. A magnetic tracking aid for a hand held optical scanner of the type being mounted on rollers which provide for both directional mobility and maintenance of depth of field and having a bottom wall with a light transmissive window therein for optically sensing printed text when it is manually moved over the printed text by a user, the magnetic tracking aid comprising:
    a flat substrate having a magnetizable surface and a top and side edge which are mutually perpendicular, alternate parallel lines of north and south poles being formed on the magnetizable surface parallel to each other and the top edge of the substrate and having a uniform equal spacing;
    a magnet strip being hingedly mounted on the substrate top edge and being rotatable thereabout to form a clip board configuration capable of releasably holding and locking individual sheets or pages of a bound volume placed on the flat substrate; and
    a magnetic flat member having a magnetizable surface in which alternate parallel lines of north and south poles are formed thereon having the same spacing and size as those on the substrate, the flat member being attached to the bottom of the hand held scanner, so that the lines of magnetic poles of the flat member align with and are attracted by the lines of poles of opposite polarity on the substrate, thereby preventing skew of the scanner as it is manually moved by a user across a page of printed text aligned and locked into position on the substrate by said magnetic strip.

2. The magnetic tracking aid of claim 1, wherein the magnetic tracking aid further comprises:
    a second magnetic strip for manual placement on the sheet or page residing on the flat substrate, the second strip being oriented generally parallel to the hinged magnetic strip, so that a magnetic attractive force between the flat substrate and second magnetic strip is generated to lock releasably a sheet or page of printed text sandwiched therebetween, even when the hinged magnetic strip is rotated away from the substrate to permit scanning of the top portion of the page.

3. The magnetic tracking aid of claim 1, wherein the magnetic tracking aid is dimensioned to be larger than the sheet or page of bound volume to be scanned, so that, when the scanner is moved partially off said sheet or page, the distance between a portion of the magnetic flat member on the scanner and the flat substrate is reduced causing increased magnetic attraction and thereby providing a mechanical stop for a sight impaired user.

4. The magnetic tracking aid of claim 3, wherein the bound volume has a binding which maintains the pages as a bound volume and about which the pages may be moved; and wherein the side edges of the flat substrate is placed against the binding to assist in alignment of the page to be scanned, when the flat substrate is placed thereunder.

5. The magnetic tracking aid of claim 1, wherein the flat substrate comprises a flexible magnetic sheet having a predetermined number of poles per inch, the predetermined number of poles per inch limiting the skew of the scanner to within 5 degrees or less during each manual scanning traversal of the printed text by a user and concurrently enabling a user to feel the relocation of the scanner as the scanner moves across the alternating poles as the scanner is positioned for subsequent scans of swaths of text.

6. The magnetic tracking aid of claim 5, wherein the flat substrate has a laminated construction comprising the magnetic sheet, a protective covering for the magnetic sheet, a metal backing layer underneath the magnetic sheet, and a semi-rigid layer to limit the flexibility of the flat substrate to enable the scanner to maintain its depth of focus while providing a minimum amount of flexibility to prevent pages of bound volumes from tearing with the tracking aid in place against the binding.

7. The magnetic tracking aid of claim 6, wherein the predetermined number of poles per inch is 18, the protective coating is 5 mils thick, the metal backing layer is steel and 2.5 mils thick, and the semi-rigid layer is 25 mils thick.

* * * * *